June 14, 1960 A. E. JOEL, JR 2,941,042

SIMULTANEOUS DIRECT-CURRENT AND MULTIFREQUENCY SIGNALING SYSTEM

Filed June 11, 1956 3 Sheets-Sheet 1

INVENTOR
A. E. JOEL, JR.
BY
ATTORNEY

June 14, 1960 A. E. JOEL, JR 2,941,042

SIMULTANEOUS DIRECT-CURRENT AND MULTIFREQUENCY SIGNALING SYSTEM

Filed June 11, 1956 3 Sheets-Sheet 2

INVENTOR
A. E. JOEL, JR.
BY
ATTORNEY

SIMULTANEOUS DIRECT-CURRENT AND MULTIFREQUENCY SIGNALING SYSTEM

Filed June 11, 1956 3 Sheets-Sheet 3

INVENTOR
A. E. JOEL, JR.
BY [signature]
ATTORNEY

United States Patent Office 2,941,042
Patented June 14, 1960

2,941,042

SIMULTANEOUS DIRECT-CURRENT AND MULTI-FREQUENCY SIGNALING SYSTEM

Amos E. Joel, Jr., South Orange, N.J., assignor to Bell Telephone Laboratories, Incorporated, New York, N.Y., a corporation of New York Filed June 11, 1956, Ser. No. 590,665
9 Claims. (Cl. 179—18)

This invention relates to telephone systems and particularly to those systems in which dialed digits expended in setting a switch train to reach an idle trunk to another office are recaptured and transmitted to said office for switching and other purposes.

In present systems in which recording features are incorporated in conjunction with step-by-step telephone switches, the digits expended by the subscriber in reaching an outgoing toll trunk are reconstructed and stored in an outgoing register sender in combination with later dialed digits. Subsequently, all of these digits are transmitted to the tandem office for switching and other purposes. As a consequence, the local office is required to have full registration capacity for all of the digits which the subscriber is ordinarily expected to dial.

Other prior art systems, in lieu of reconstructing the digits expended in reaching the outgoing trunk, require the subscriber to dial a particular directing code, or prefix, to the called directory number in order to route the call to a particular trunk in a tandem location which is equipped to receive this type of call.

It is therefore an object of this invention to transmit signals dialed by the calling subscriber to the tandem office, without the necessity of employing at the originating office full register capacity for all the digits dialed, as required in prior systems.

Another object of this invention is the transmission of signal information from a subscriber to a centrally located tandem office without the necessity of a directing code or prefix to the called directory number.

A feature of this invention is the utilization of multi-frequency out-pulsing means for transmission of the reconstructed digits expended in reaching the outgoing trunk.

Still another feature of this invention includes means for the simultaneous transmission of direct-current dialing signals by the calling subscriber in time coincidence with the multifrequency pulses above referred to.

A further feature of this invention relates to facilities for the simultaneous reception in the tandem or receiving office of the multifrequency and direct-current signals originating in the local office.

These and other objects and features of the invention may be accomplished by the use of two types of signaling between the local office and the tandem office. The digits the subscriber has dialed in reaching the trunk circuit outgoing to tandem, and an additional digit stored in the trunk circuit while awaiting connection of the tandem sender and a multifrequency receiver to the incoming end of the trunk, are transmitted to the tandem office by multifrequency pulsing. These digits are recaptured by a code reconstruction technique which illustratively utilizes the "point of seizure" method, as explained herein, but may also use identifiers or other suitable arrangements.

As the subscriber continues to dial the remaining portion of the called directory number, the additional digits are directly repeated through the trunk circuit and are transmitted by direct-current signaling over the ring conductor of the trunk to tandem. Thus the digits dialed by the customer in reaching the trunk which are reconstructed and forwarded by multifrequency pulsing, and the further digits dialed by the customer which are pulsed out in the form of direct-current signals, are transmitted simultaneously over the trunk to the awaiting tandem sender. There is no need, therefore, for any registration capacity in the originating office greater than that required for the reconstructed code digits which were expended in reaching the outgoing trunk and an additional digit stored in the outgoing trunk while awaiting connection of the tandem sender and multifrequency receiver, since the further digits are repeated directly through the trunk loop to tandem by direct-current signaling.

These and other objects and features of the invention may be more readily understood by an examination of the accompanying specification, appended claims and attached drawings in which:

GENERAL DESCRIPTION

Figure 1:
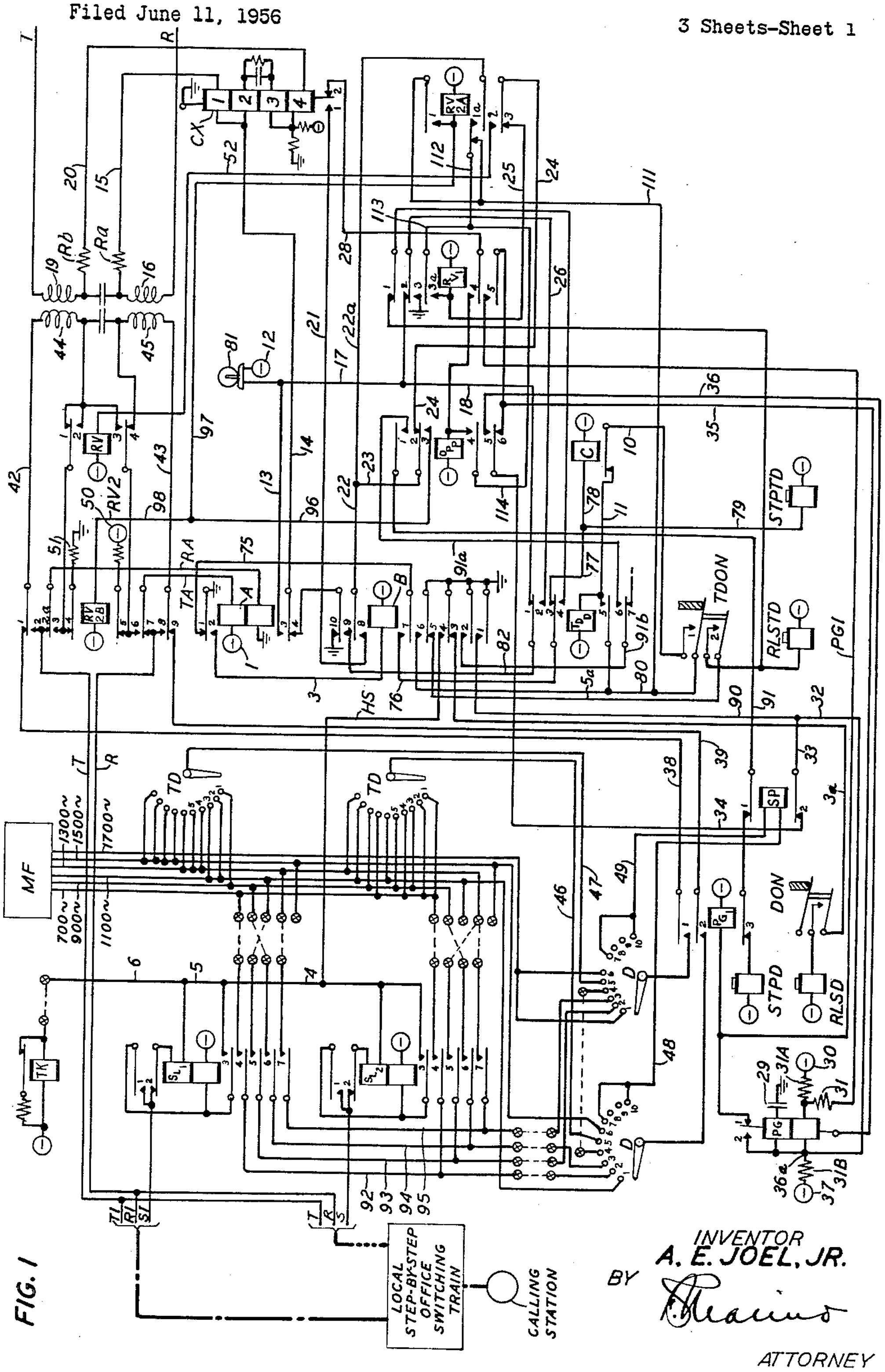
Fig. 1 is a circuit illustrating the local office outgoing trunk portion of the present invention, including the multi-frequency and direct-current out-pulsing means.

In accordance with the invention, a subscriber desiring a connection to a line terminating in an office in a near-by toll area, by removing his receiver from the switch-hook, starts an idle line finder paired with a first selector in search of his line. As soon as the line is found, dial tone is transmitted. The subscriber then proceeds to dial the called directory number. In response to the dialing of one or more of the office code digits, the selector switches of a switching train are operated to extend the connection from the calling line to an outgoing trunk, over which trunk a connection may be further extended to a tandem office in which a trunk to the office of the wanted line terminates.

Immediately following the seizure of the trunk at tandem, an idle sender in the tandem office is connected thereto. The sender is provided with registers for registering the remaining digits of the directory number dialed by the calling subscriber. However, since a digit dialed by the subscriber might be lost during the time elapsing between the seizure of the trunk and the connection of an idle sender at the tandem office, the trunk is provided with a digit register for registering the digit dialed, following the last code digit dialed to reach the trunk. Since the trunk may be seized in response to the dialing of one, two, or three code digits, the trunk digit register may record the second or third code digit or the thousands numerical digit.

As soon as the digit is stored in the trunk a relay path is formed to permit direct signaling over the ring conductor of the tandem trunk by the calling subscriber. In the interim, the digits expended in reaching the trunk are recaptured by a code reconstruction technique, explained herein, and these digits together with the digit stored in the trunk digit register are out-pulsed to tandem, upon connection of a multifrequency receiver at tandem, by multifrequency pulsing. When the tandem sender has received all the digits required to complete the call, a signal is returned over the trunk loop, which causes the outgoing portion of the trunk circuit to disconnect the multifrequency signal circuit and prepare for voice transmission.

It will be noted from the drawing that the details of the originating office and the tandem office have not been shown. Likewise, none of the details of the terminating office has been shown. Reference may be made to Patent No. 2,629,016 to J. W. Gooderham on February 17, 1953, for a detailed showing of a step-by-step originating office. Reference may also be made to the tandem telephone system described in Patent No. 2,281,636, granted May 5, 1942, to W. B. Strickler, and to the patents therein referred to, for a complete disclosure of the tandem office portion of the system which is not shown in detail herein. A suitable type of multifrequency receiving circuit as used in the present invention is disclosed in Patent No. 2,332,912 granted October 26, 1943, to G. Hecht et al. The multifrequency sender disclosed symbolically herein is disclosed in greater detail in Patent No. 2,288,251 to P. B. Murphy on June 30, 1942.

Having described the operation in a general manner, the functioning of the invention will be described in detail in conjunction with the processing of a typical call.

DETAILED DESCRIPTION

*Seizure of outgoing portion of trunk circuit in local office*

When the trunk circuit (Fig. 1) is seized by a selector (not shown) over leads T1, R1 and S1 in response to dialing signals by the subscriber, relays A, B, SL1 and TK operate in turn. Relay A operates through battery 1, upper operating coil of relay A, conductor TA, normally closed No. 7 contacts of relay RV2B, conductor R, conductor R1, through preceding selector switches (not shown) and the subscriber's loop and back over conductor T1, conductor T, No. 2*a* contacts of relay RV2B, conductor RA, and the lower operating winding of relay A to ground. Relay A responds to each line open and closure condition.

The operating path for relay B may be traced from ground, No. 2 contacts of relay A, conductor 3, and the winding of relay B to negative battery. Relay B is a slow-release relay and operates only once on each call.

Relay SL1 operates over a path which may be traced from ground, No. 4 contacts of relay B, conductor HS, conductor 4, conductor 5, upper operating winding of relay SL1, No. 2 contacts of relay SL1 to the sleeve conductor S1 and negative battery at the preceding switch (not shown).

The holding path for relay SL1 as well as preceding switches in the train may be traced from ground, No. 4 contacts of relay B, conductor HS, conductor 4, No. 3 contacts of relay SL1, and in parallel to the lower operating winding of relay SL1 and No. 1 contacts of relay SL1 to the sleeve conductor S1 and preceding switches as described above.

The operating path for relay TK may be traced identically with that of relay SL1 above but continuing over conductor 6 through the operating winding of relay TK to negative battery.

*Storage of digit after seizure*

On the advent of the first dialed digit after seizure of the trunk, the dial pulses operate and hold relay C, and energize the step magnet STPTD of minor switch TD as explained herein. Relay C is a slow-release relay which will remain energized throughout the pulsing of an entire digit, releasing only on the interdigital interval.

Relay C operates over a path which may be traced from ground, No. 1 contacts of relay A, conductor 75, No. 7 contacts of relay B, conductor 76, No. 3 contacts of relay TDD, conductor 77, conductor 78, and the operating winding of relay C to negative battery. The operating path for magnet STPTD may be traced similarly to conductor 77, subsequently to conductor 79 and the operating winding of relay STPTD to negative battery.

The dial pulses on each line open condition operate switch magnet STPTD which, in turn, steps switch TD accordingly. When the dialing of the digit is completed, relay TDD operates over a path which may be traced from ground, No. 6 contacts of relay B, conductor 80, No. 1 contacts of switch off-normal contacts TDON operated, conductor 10, contacts of relay C, conductor 11, operating winding of relay TDD to negative battery. Relay C is released at this time since it is designed to release on the interdigital interval, as explained above.

It may be noted that the initial condition on the ring conductor R to tandem is a ground potential. This ground may be traced from the No. 10 contacts of relay B, No. 4 contacts of relay A, conductor 14, winding 1 of relay CX, conductor 15, resistance R*a*, coil 16, to the ring conductor R to tandem.

On its original operation, relay A changes the normal ground condition on the ring lead R to tandem to a minus 48-volt signal. This operation may be traced from battery 12, lamp 81, conductor 13, No. 3 contacts of relay A, conductor 14, No. 1 winding of relay CX, conductor 15, resistance R*a*, coil 16 to the ring conductor R. This condition is detected by a similar receiving relay CXT (Fig. 2) in the incoming trunk circuit at tandem which, in turn, initiates connection of a sender to the trunk as will be explained herein.

Figure 2:
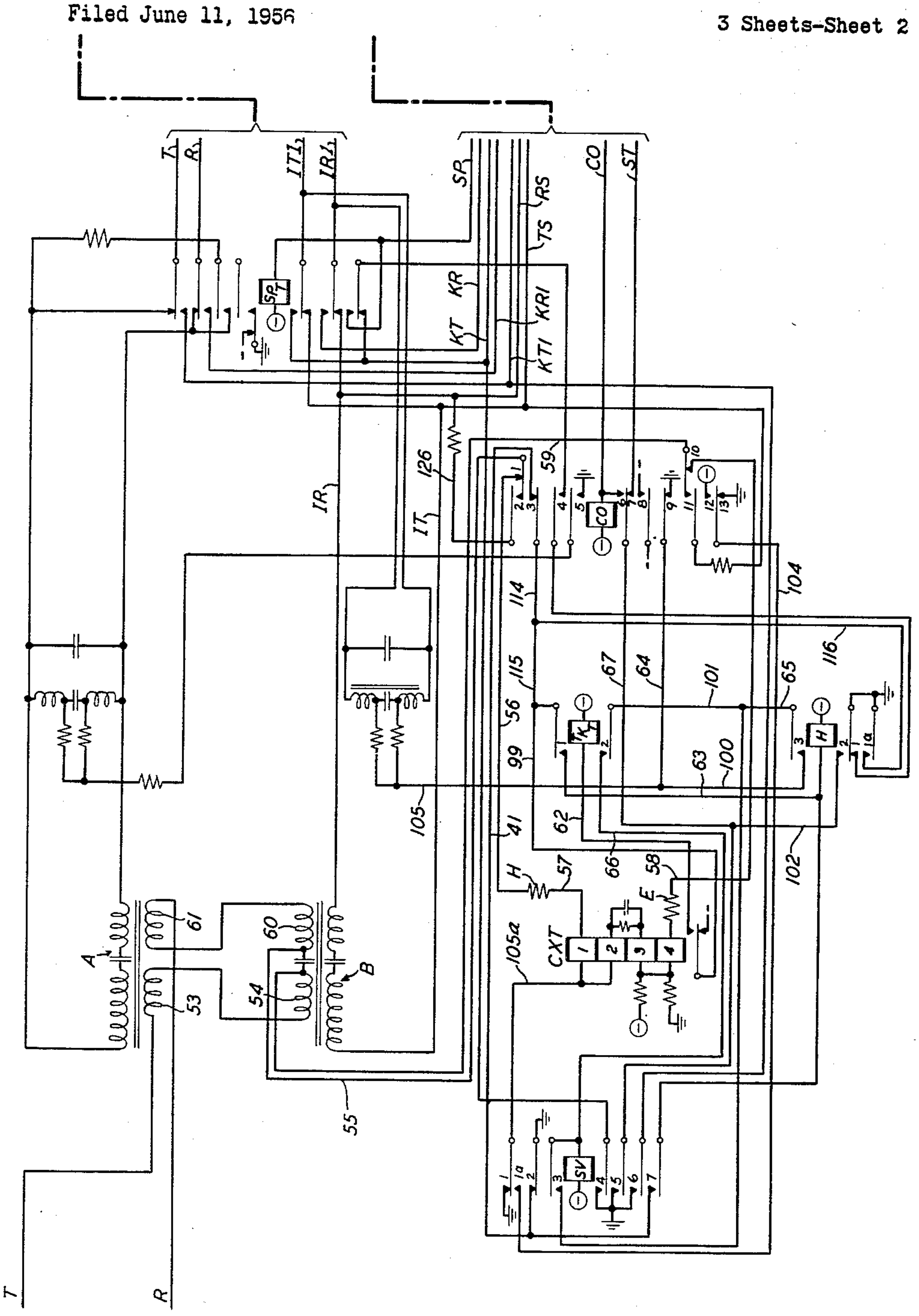
Fig. 2 shows the tandem office incoming trunk portion of the circuit.

The interrelation of relays CX, CXT and CXX, as elements in a composite signaling system, are such that signals transmitted over the ring conductor R from the local office, although passing through No. 1 winding of relay CX, do not affect said relay. The signals emanating from the local office do, however, affect the operation of relay CXT or relay CXX as determined by the operation of relay CO (Fig. 2). If relay CO is operated, signals emanating from the local office are electrically divorced from relay CXT and are transmitted over a path described herein to relay CXX. With relay CO in the released condition, signals originating in the local office operate on relay CXT only, as will be seen in the detailed explanation.

Similarly, operation of relay SUP in the incoming sender circuit (Fig. 3), although effective in transmitting signals through relay CXX, does not affect the operation of said relay but, instead, controls the operation of relay CX in the local office over the ring conductor R. Relays CXT and CXX cannot affect the operation of each other, since through the contacts of relay CO, only one of the relays CXT or CXX is connected to the ring conductor R at a given time. As explained in the patents herein referred to, this type of composite signaling operation, also referred to as differential duplex signaling, is the ability to transmit signals in both directions at the same time without interfering with the proper operation of the relays at either end of the transmission line.

The precise structure of the relays CX, CXX and CXT does not form part of the present invention and may take varying forms similar to those in the patents hereinafter referred to. It will suffice for the purposes of this invention to state that the No. 1 windings on relays CX, CXX and CXT are in series with the operating wire (ring conductor), and the No. 4 windings are in series with the neutralizing conductor, in this case, the tip conductor T. Windings 2 and 3 are balancing windings for windings 1 and 4. A battery and potentiometer device are shown connected to the junction of windings 3 and 4 of each of the relays.

In the normal condition, ground is applied to the ring conductor at the distant end of the circuit and current flow from the battery and potentiometer to ground maintains the relays in a given operated condition. When the polarity on the ring conductor is changed to negative battery potential, the relay transfers to the opposite operated condition.

The broad use of relays CX, CXT and CXX (Fig. 3) in a composite signaling operation is well known; reference may be made to Patents No. 1,361,486 to H. S. Osborne et al. on December 7, 1920, and No. 2,586,901 to S. W.

Allison on February 26, 1952, for a more complete exposition of similar arrangements.

*Connection of sender at tandem office*

In consequence of the initial application of a negative 48-volt signal on the ring lead R at the local office, the trunk at the tandem end is closed through supervisory relay CXT (Fig. 2). The operating path for relay CXT may be traced from the ring conductor R, hybrid coils 61 and 60, conductor 55, No. 1 transfer contacts of relay CO, conductor 56, resistance H, through the operating windings of relay CXT.

Operation of relay CXT, in turn, causes the operation of relay TKT over a path which may be traced from ground, No. 2 contacts of relay SV, conductor 41, No. 3 contacts of relay CO, conductor 114, conductor 115, conductor 99, contacts of relay CXT, conductor 62, through the winding of relay TKT to negative battery.

The operation of relay TKT completes a path for the operation of relay H which may be traced from ground, No. 2 contacts of relay SV, conductor 41, No. 3 contacts of relay CO, conductor 114, conductor 115, No. 1 contacts of relay TKT, conductor 63 to the winding of relay H and negative battery. Relay H locks operated over a circuit which may be traced from ground, No. 1A contacts of relay H, conductor 116, conductor 115, No. 1 contacts of relay TKT, conductor 63, to the winding of relay H and negative battery. The actuation of relay H causes the operation of relay SV and, in addition, connects ground to lead ST to the sender link and connector circuit to serve as a start signal for connection of the sender to the trunk circuit.

The operating path for relay SV may be traced from ground, No. 9 contacts of relay CO, conductor 64, conductor 100, No. 3 contacts of relay H, conductor 65, conductor 101, No. 2 contacts of relay TKT, conductor 66, to the winding of relay SV and negative battery. Relay SV locks operated to the mid-point of a grounded simplex arrangement of the tip and ring conductors in the sender circuit (not shown), over conductor 105*a*, and also to the No. 9 contacts of relay CO over conductor 64.

The connection of ground to lead ST to the sender link and connector circuit may be traced over a path beginning from ground, No. 2 contacts of relay H, conductor 102, conductor 67, No. 7 contacts of relays CO to lead ST to the sender link and connector circuit. Energization of lead ST causes the sender link and connector circuit to function and complete a connection between the incoming trunk circuit through sender link and connector crossbar switches (conventionally indicated in Fig. 3) to an incoming sender circuit. The operation in detail of the sender link and connector circuit and related tandem office common control circuits, hereinafter referred to but not described in detail, is given in Patent 2,559,312 to J. B. Newsom on July 3, 1951, to which reference is made.

When the incoming sender circuit is attached, ground is connected to lead CO by means not shown, causing the operation of relay CO.

Figures 3, 4:
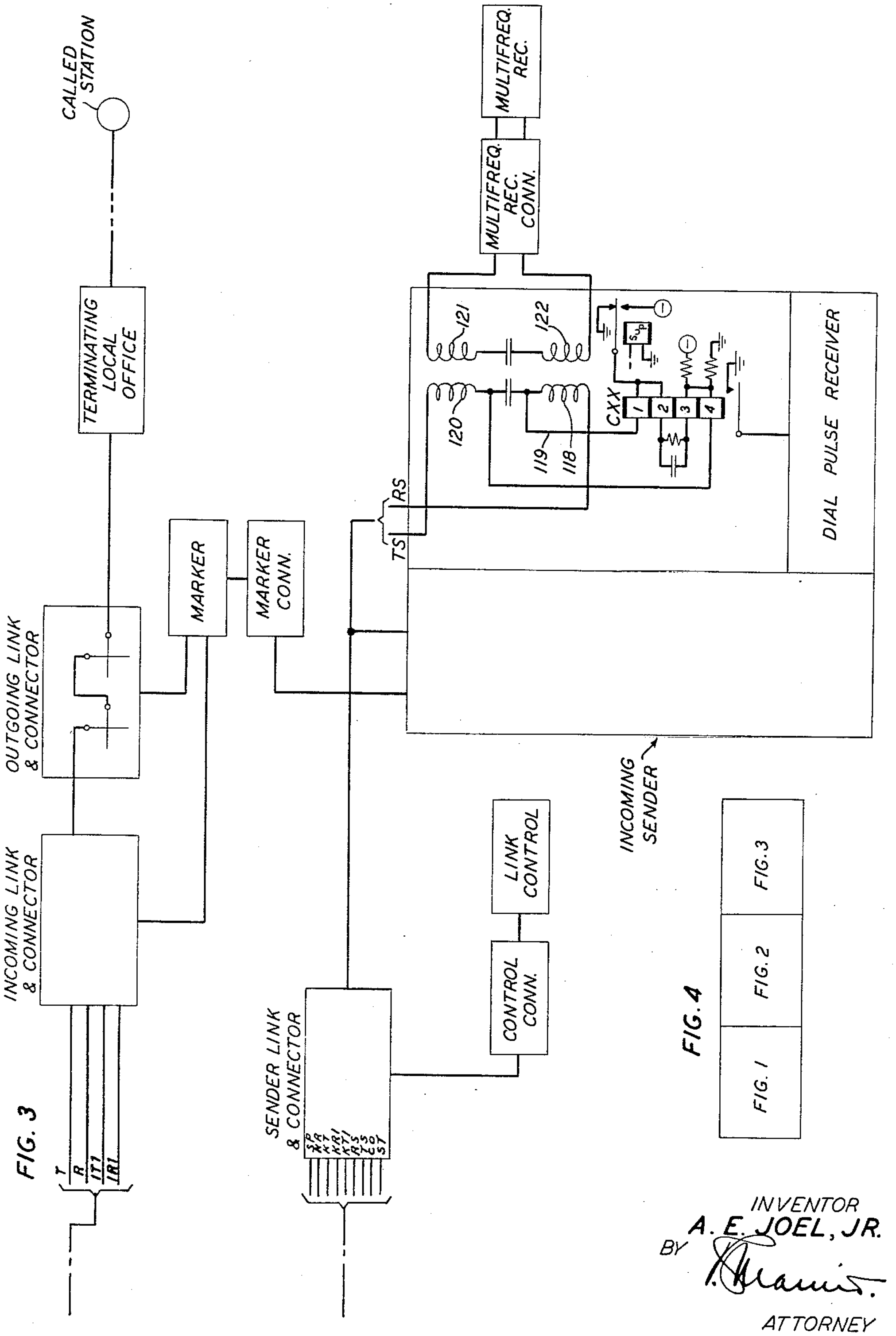
Fig. 3 shows the remaining tandem office apparatus required for the reception of signals emanating from the circuitry of Fig. 1, and the terminating local office and called station.
Fig. 4 shows the relative arrangement of Figs. 1–3 in order to disclose the complete invention.

Relay CO, in operating, opens the operating circuit of relay H at its No. 3 contacts and that of relay SV at its No. 9 contacts. These relays, however, remain operated through their locking circuits. In addition, relay CO disconnects ground from lead ST to the sender link and connector circuit and transfers the control of polarity on the trunk conductors to relay SUP (Fig. 3).

Ground is disconnected from the lead ST as a result of the opening of the No. 7 contacts of relay CO. At this time, relay SUP controls the polarity of the battery applied to the ring conductor R of the trunk back to the local office, through the No. 1 winding of relay CXX, conductor 119, coil 118 and conductor RS. With relay SUP operated (by means not shown), a minus 48-volt potential is applied to the ring conductor R through the No. 1 winding of relay CXX, conductor 119, coil 118, conductor RS, sender link and connector circuit, conductor RS (Fig. 2) conductor 126, No. 2 contacts of relay CO, conductor 55, coils 60 and 61, of the trunk loop.

Relay SPT in the trunk circuit operates at this time over conductor SP, through the winding of a marginal relay in the sender circuit, not shown herein. Operation of relay SPT disconnects conductors T, R, IT1 and IR1 from hybrid coils A and B and connects them to conductors KT1, KR1, KT and KR, respectively.

*Transmission of direct-current signals*

When a sender has been connected to the incoming trunk circuit at the tandem office as explained above, the minus 48-volt signal from the contacts of relay SUP returns over the trunk to operate relay CX in the outgoing trunk circuit. The generation of this signal will be explained herein. Relay CX is operated over a path which includes the ring conductor R, coil 16, resistance R*a*, conducted 15 to the windings of relay CX. With relay CX operated, relay RV1 operates over a path which may be traced from ground, No. 1 contacts of relay CX, conductor 21, No. 8 contacts of relay B, conductor 22, conductor 23, No. 2 contacts of relay OPP, conductor 24, No. 3 contacts of relay RV2A, conductor 25, to the winding of relay RV1. Relay RV1 locks operated through its No. 3*a* contacts, conductors 113 and 112, No. 1*a* transfer contacts of relay RV2A, conductor 111, conductor 80, No. 6 contacts of relay B, to ground.

It may be noted that operation of relay B (Fig. 1) changes the back contact path of relay A which, through relay TDD normal, continues minus 48 volts on the ring lead R to tandem during dial pulsing of the digit stored in the trunk. This path may be traced from battery 12, lamp 81, conductor 17, conductor 18, normally closed No. 1 contacts of relay TDD, conductor 82, No. 9 contacts of relay B, No. 4 contacts of relay A, conductor 14, No. 1 winding of relay CX, conductor 15, resistance R*a*, coil 16 to the ring conductor R. It is thus seen that the minus 48-volt condition is maintained on the ring conductor R to tandem until relay TDD is operated. In consequence, no dial pulsing is transmitted to tandem until the digit has been acknowledged to have been stored in the trunk by the operation of trunk digit relay TDD.

However, with relay RV1 and relay TDD both operated, a path is prepared for transmitting the further dialing signals by the subscriber directly over the ring conductor to tandem. This path may be traced from ground through the No. 3 contacts of relay RV1, conductor 26, No. 2 contacts of relay TDD, conductor 82, No. 9 contacts of relay B to the No. 4 contacts of relay A. Thus on each release of relay A, indicating a dial pulse, a ground potential will be placed on the ring conductor R to tandem, over conductor 14 and the path previously traced, thereby directly forwarding the dialing pulses resulting from continued dialing by the subscriber.

*Reception of further dialed digits at tandem office*

At this time, the sender may begin to receive dial pulses from the local office. These pulses are transmitted over the ring conductor R from the originating end of the trunk, coil 61, coil 60, conductor 55, No. 2 contacts of relay CO, conductor RS, through the sender link and connector circuit (Fig. 3), hybrid coil 118, conductor 119, to the operating windings of relay CXX, thereby operating said relay. Relay CXX continues to respond to each line open and closure condition occasioned by the further dialing of the subscriber. The contacts of relay CXX repeat the dial pulses to the dial pulse receiver, which is conventionally indicated in Fig. 3. Reference may be made to an article entitled "The Originating Dial Pulse Register Circuit for the No. 5 Crossbar System" by J. W. Dehn in the Bell Laboratories Record, January 1950, page 7, for a more complete description of a suitable dial pulse receiver.

*Connection of multifrequency receiver at tandem office*

When the sender has found an available multifrequency receiver, relay SUP is released (by means not shown), reversing the polarity on the ring conductor. Thus a ground condition is placed on said conductor which causes the distant office trunk equipment to initiate the transmission of multifrequency pulses as explained herein.

The multifrequency pulses, which may be received simultaneously with the direct-current pulses, are transmitted through repeating coil B, conductors IR, IT, RS, and TS, the sender link and connector circuit, hybrid coils 118, 120, 121 and 122, the multifrequency receiver connector, to the multifrequency receiver (Fig. 3).

*Transmission of multifrequency signals*

When the multifrequency receiver is attached at tandem, as explained above, the minus 48-volt condition on the ring conductor from the tandem office (at the contacts of relay CXX) to the local office, which originated when the sender was connected, is removed, and a ground condition is substituted therefor, as explained above. Relay CX is thereby released. Relay OPP operates over a path which may be traced from ground, No. 2 contacts of relay CX, conductor 28, No. 4 contacts of relay RV1, through the operating winding of relay OPP to negative battery.

It may be noted at this juncture that prior to the operation of relay OPP, a ground potential is applied through the No. 1 contacts of relay B over conductor 90, conductor 32, resistances 31 and 31*a* to negative battery 30. Ground may also be traced from the No. 1 contacts of relay B, conductor 90, conductor 33, No. 2 contacts of relay SP, conductor 34, No. 6 contacts of relay OPP, conductor 35 to junction 36*a*. Relay PG is thus in its released condition.

When relay OPP operates, ground is removed from junction 36*a* and current flows through the lower winding of relay PG in a direction to operate said relay. At this time, current also flows through the upper winding of relay PG tending to charge condenser 29 but in a direction to prevent relay PG from operating. When condenser 29 is fully charged the current through the upper winding of relay PG subsides and relay PG operates, moving its armature to contacts No. 2. Operation of relay PG again places a ground condition on junction 36*a* through the No. 1 contacts of relay B, conductor 90, conductor 33, No. 2 contacts of relay SP, conductor 34, No. 5 contacts of relay OPP, conductor 36, No. 2 contacts of relay PG to junction 36*a*. The ground at junction 36*a* causes the current through the lower winding to change direction, tending to release relay PG and the condenser discharges through the upper winding of relay PG tending to keep relay PG operated. The discharge path for the condenser may be traced from ground through condenser 29, upper winding of relay PG, No. 2 contacts of relay PG, conductor 36, No. 5 contacts of relay OPP, conductor 34, No. 2 contacts of relay SP, conductor 33, conductor 90, No. 1 contacts of relay B to ground. When the condenser is discharged, relay PG releases and ground is removed from junction 36*a*. Relay PG will again tend to operate and the condenser to charge with the process repeating itself as above. Relay PG will continue to operate and release at a rate fixed by the parameters of condenser 29 and the resistance in the condenser discharge path, thereby timing the multifrequency signals which will be transmitted from switches TD and D.

The operation of relay RV1, previously described, causes the operation of relay PG1 over a path which may be traced from ground at junction 36*a* as traced above, conductor 35, No. 5 contacts of relay RV1, conductor PG1, to the coil of relay PG1 and negative battery. Operation of relay PG1 opens the operating path of the step magnet STPD and prevents the premature stepping of switch D. Relay PG1 remains operated over a path which may be traced from ground, No. 1 contacts of relay B, conductor 90, No. 2 contacts of relay SP, conductor 34, No. 5 contacts of relay OPP, conductor 36, No. 1 contacts of relay PG, winding of relay PG1 to negative battery.

With each operation of relay PG, relay PG1 releases, thereby operating step magnet STPD through a circuit which may be traced from negative battery, winding of relay STPD, No. 3 contacts of relay PG1, No. 1 contacts of relay SP, conductor 91, No. 1 contacts of relay OPP, conductor 91*a*, No. 6 contacts of relay TDD, conductor 91*b*, No. 2 contacts of relay B to ground. Each operation of step magnet STPD advances switch D one position.

In the first step position of switch D, an enabling signal of 1100 and 1700 cycles per second, for the multifrequency receiver at tandem, is transmitted from source MF, contacts 1 and 2 of relay PG1, conductors 38 and 39, the No. 1 and No. 9 contacts of relay RV2B, conductors 42 and 43 to the hybrid coils 44 and 45 and by induction to the tandem trunk. The multifrequency source is not shown in detail; reference may be made to Patent 2,288,251 to P. B. Murphy, June 30, 1942, and the patents therein referred to, for a complete exposition of the device.

In the remainder of the switch positions, the reconstructed code digits and the digit stored in the trunk are transmitted on a two-out-of-five frequency basis, as determined by the operated contacts of relay SL1 in accordance with a predetermined code as shown below.

TABLE I

| Digit: | Frequencies in cycles per second |
|---|---|
| 1 | 700+900 |
| 2 | 700+1100 |
| 3 | 900+1100 |
| 4 | 700+1300 |
| 5 | 900+1300 |
| 6 | 1100+1300 |
| 7 | 700+1500 |
| 8 | 900+1500 |
| 9 | 1100+1500 |
| 0 | 1300+1500 |
| Enable | 1100+1700 |
| Dismiss | 1500+1700 |

For example, in position 2 of switch D, a signal of 700 cycles is transmitted from the signal source MF, through No. 4 contacts of relay SL1, conductor 92, No. 2 position of left switch D, No. 2 contacts of relay PG1, conductor 39, No. 9 contacts of relay RV2B through the hybrid coil 45 and by induction to the tandem trunk. Simultaneously, a frequency of 1100 cycles is transmitted from the multifrequency source through No. 5 contacts of relay SL1, conductor 93, No. 2 position of right switch D, No. 1 contacts of relay PG1, conductor 38, No. 1 contacts of relay RV2B, conductor 42, hybrid coil 44 and by induction to the tandem trunk.

In position 3, a signal of 900 cycles is transmitted from the source MF through the No. 6 contacts of relay SL1, conductor 94, No. 3 position of left switch D, No. 2 contacts of relay PG1, conductor 39, No. 9 contacts of relay RV2B, hybrid coil 45 and by induction to the tandem trunk. Simultaneously, a frequency of 1300 cycles is transmitted from the source through the No. 7 contacts of relay SL1, conductor 95, No. 3 position of right switch D, No. 1 contacts of relay PG1, conductor 38, No. 1 contacts of relay RV2B, conductor 42, hybrid coil 44 and by induction to the tandem trunk.

The transmission of these signals represents the reconstruction by the "point of seizure" method, of the digits dialed by the subscriber in reaching the tandem RLSTD and RLSD through the off-normal contacts TDON and DON of switches TD and D, respectively.

Relay RLSTD operates over a path which may be traced from ground, No. 5 contacts of relay B, conductor 5*a*, No. 2 contacts of switch off-normal contacts TDON, operating winding of relay RLSTD to negative battery.

Relay RLSD operates over a path from ground, No. 3 contacts of relay B, conductor 3A, contacts of switch off-normal contacts DON, operating winding of relay RLSD to negative battery.

Energization of release magnets RLSTD and RLSD returns their respective switches TD and D to normal, thereby interrupting the operating circuits for the release magnets.

It is understood that the embodiments of the invention described above are exemplary only, it being obvious to those skilled in the art that various changes and modifications may be made therein without departing from the scope and spirit of the invention.

What is claimed is:

1. In a telephone system, a calling line, outgoing trunks connectable to a distant office, means under the control signals from said calling line for extending a connection from said line over one of said trunks to said distant office, alternating-current signaling means under control of said trunk for transmitting an initial portion of said signals over said trunk to said distant office, and direct-current signaling means under control of said calling line for transmitting a terminal portion of said signals over said trunk to said distant office, said direct-current signaling means and said alternating-current signaling means including means for simultaneous transmission of both types of signals.

2. In an automatic telephone system, a calling line, a plurality of outgoing trunks over any one of which connections may be extended to a distant office, selector switches responsive to signaling over said calling line for extending a connection from said calling line to one of said trunks, alternating-current signaling means under control of said one of said trunks for transmitting an initial portion of said signals over said trunk to said distant office, direct-current signaling means under control of said calling line for transmitting a terminal portion of said signals to said distant office, said alternating current signaling means and said direct-current signaling means including means for simultaneous transmission of both types of signals, and direct-current receiving means and alternating-current receiving means connected to said trunk at the distant office end thereof for receiving and registering said alternating-current and direct-current signals.

3. In a telephone system, a calling line, a plurality of trunks over any one of which connections may be extended to any one of a plurality of offices, selector switches responsive to the dialing of code digits for extending the connection from said calling line to one of said trunks, means connected for said trunk for reconstructing said code digits, digit storage means connected to said trunk for storing an additional digit dialed into said trunk, multifrequency signaling means connected to said means for reconstructing said code digits and to said digit storage means for out-pulsing an initial portion of said code digits including said reconstructed code digits and said digit stored in said digit storage means over said trunk, and direct-current signaling means effective during dialing and after the storage of said additional digit for repeating through said trunk a terminal portion of said code digits including all digits subsequent to said digit dialed into said digit storage means, said multifrequency signaling means and said direct-current signaling means including means for the simultaneous transmission of both types of pulses signaling.

4. In a telephone system, a subscriber's line, selector switches responsive to dialing of code digits over said subscriber's line for extending a connection from said line to one of a plurality of trunks, said trunks extending to a distant office means under control of said trunk for reconstructing said code digits, trunk digit registration means connected to said trunk for storing a digit dialed into said trunk after seizure thereof, multifrequency signaling means connected to said means for reconstructing said code digits and to said trunk digit registration means for out-pulsing said reconstructed code digits and the digit stored in said trunk digit registration means over said trunk, timing means connected to said multifrequency signaling means, for controlling the operation thereof and direct-current signaling means responsive to dialing signals over said subscriber's line for repeating over said trunk, all digits dialed subsequent to the digit stored in said trunk registration means, said multifrequency signaling means and said direct-current signaling means including means for the simultaneous transmission of both types of pulses.

5. In a telephone switching system, a calling line, a plurality of trunks over any one of which connections may be extended to a distant office, selector means responsive to the dialing of code digits for seizure of one of said trunks, trunk digit storage means for registering an additional digit dialed directly into said trunk, relay means responsive to the operation of said trunk digit storage means, means connected to said trunk for reconstructing said code digits dialed in reaching said trunk, multifrequency signaling means connected to said means for reconstructing said code digits and to said trunk digit storage means for out-pulsing over said trunk to a distant office an initial portion of said code digits including the reconstructed code digits and the digit stored in said trunk digit storage means, and direct-current signaling means responsive to said relay means and effective during dialing for repeating directly over said trunk a terminal portion of said code digits including the digits dialed subsequent to the digit dialed into said trunk digit storage means, said multifrequency signaling means and said direct-current signaling means operating in unison to simultaneously transmit both types of signaling.

6. In a local step-by-step telephone office, a calling line, a plurality of trunks connected to a distant office, selector switches responsive to direct-current dialing signals over said calling line for extending a connection from said calling line to one of said plurality of trunks, means under control of said trunk for reconstructing said direct-current signals dialed to reach said trunk, registration means connected to said trunk for storing an additional signal dialed over said calling line into said trunk, multifrequency signaling means connected to said means for reconstructing said direct-current dialing signals and to said means for storing said signal dialed into said trunk for out-pulsing said signals over said trunk to a distant office; direct-current signal repeating means for directly transmitting over said trunk to said distant office the signals dialed subsequent to said additional signal dialed into said trunk; said multifrequency signaling means and said direct-current repeating means operating simultaneously to transmit in combination both types of signals over said trunk to said distant office, and means in said trunk circuit for inhibiting the operation of said direct-current repeating means prior to the storage of said additional signal dialed over said calling line into said trunk.

7. In a telephone switching system, a calling subscriber's line, a plurality of trunks extending to a distant telephone office, stey-by-step selector devices for extending said calling line to one of said trunks in response to direct-current code signals dialed into said calling line, means connected to said trunk for reconstructing said direct-current code signals, trunk digit registration means for storing an additional digit dialed over said calling line directly into said trunk, multifrequency signaling means connected to said trunk digit registration means and to said means for reconstructing said direct-current trunk. In this case the cross-connections between the contacts of relay SL1 and the multifrequency source MF reproduce the original identity, in code, of the digits 2 and 5, expended in reaching the trunk. If the circuit of Fig. 1 had been seized by a selector associated with relay SL2, the digits that would be reconstructed would be 4 and 5 (as seen from Table I). Thus the digits which are reconstructed are related to the point at which the trunk is seized.

In position 4, no signals are transmitted, it being assumed in this instance that only two digits were dialed to reach the tandem trunk at this position. If, however, three digits were dialed, the third digit would be reconstructed in the manner set forth for the previous two.

In position 5 of switch D, the digit registered in switch TD is transmitted on a two-out-of-five frequency basis. For example, if the digit stored in switch TD is 5, a frequency of 1300 cycles will be transmitted from the source through the No. 5 position of upper switch TD, conductor 47, No. 5 position of right switch D, No. 1 contacts of relay PG1, conductor 38, No. 1 contacts of relay RV2B, conductor 42, hybrid coil 44 and by induction to the tandem trunk. Simultaneously, a frequency of 900 cycles will be transmitted from the source through position 5 of lower switch TD, conductor 46, No. 5 position of left switch D, No. 2 contacts of relay PG1, conductor 39, No. 9 contacts of relay RV2B, conductor 43, conductor 45 and by induction to the tandem trunk.

In position 6, a predetermined signal is dispatched to the multifrequency receiver at tandem, dismissing the receiver. This signal comprises a 1500-cycle impulse transmitted from the source MF through No. 6 position of left switch D, No. 2 contacts of relay PG1, conductor 39, No. 9 contacts of relay RV2B, conductor 43, hybrid coil 45 and by induction to the tandem trunk. Simultaneously, a 1700-cycle frequency signal is impressed through No. 6 position of right switch D, No. 1 contacts of relay PG1, conductor 38, No. 1 contacts of relay RV2B, conductor 42, hybrid coil 44 and by induction to the tandem trunk.

In position 7, relay SP operates over a path which may be traced from battery 50, No. 5 contacts of relay RV2B, No. 4 contacts of relay RV, hybrid coil 45, conductor 43, No. 9 contacts of relay RV2B, conductor 39, No. 2 contacts of relay PG1, No. 7 position of left switch D, conductor 48, winding of relay SP, conductor 49, No. 7 position of right switch D, No. 1 contacts of relay PG1, conductor 38, No. 1 contacts of relay RV2B, conductor 42, hybrid coil 44, No. 1 contacts of relay RV, No. 4 contacts of relay RV2B, through resistance 51 to ground.

The operation of relay SP prevents further stepping of switch D by interrupting the operating path of step magnet STPD through the opening of the No. 1 contacts of relay SP. Also, the further operation and release of relay PG is prevented by the opening of the No. 2 contacts of relay SP.

As stated above, the multifrequency pulses may be transmitted simultaneously or in advance of the direct-current pulses dialed by the subscriber.

*Release of sender at tandem office and completion of call*

When the sender has received all necessary information for completing the call it turns over the routing information for the call to a marker, which functions to complete a connection between the incoming trunk circuit and an outgoing trunk in the desired trunk group. In addition, the sender places a momentary minus 48-volt signal on the ring conductor R by momentarily operating relay SUP through means not shown herein, as not essential to an understanding of the present invention. Reference may be made to Patent 2,594,014 to W. T. Haines and J. B. Newsom, April 22, 1952, and the patents referred to therein for a detailed explanation of the type of supervisory signaling conducted by relay SUP in this embodiment.

When the incoming sender has completed its assigned functions by out-pulsing the desired information to the terminating local office, relay SPT is released and the talking channels are completed from the hybrid coil B to the incoming link and connector circuits over leads IT1 and IR1 and the contacts of relay SPT.

The momentary minus 48-volt signal, described above, is transmitted from the sender over trunk conductor R, to relay CX, operating said relay. When relay CX operates, a circuit for the operation of relays RV2A and RV2B may be traced from ground through the No. 1 contacts of relay CX, conductor 21, No. 8 contacts of relay B, conductor 22, conductor 23, No. 3 contacts of relay OPP, conductor 96, conductor 98, through the winding of relay RV2B and similarly over conductor 97 through the winding of relay RV2A.

Both relays lock operated over a circuit including ground, No. 6 contacts of relay B, conductor 80, conductor 111, No. 1 contacts of relay RV2A through the winding of relay RV2A and over conductors 97 and 98 through the winding of relay RV2B.

It may be noted that relays OPP and RV1 do not release at this time but, instead, their control is switched to relay CX operated, over a path including ground on the No. 1 contacts of relay CX, conductor 21, No. 8 contacts of relay B, conductor 22, **22*a*, No. 1A contacts of relay RV2A, conductor 112, conductor 113, No. 3A contacts of relay RV1 and conductor 114** to the No. 4 contacts of relay OPP. When relay CX releases, these holding paths are interrupted by the removal of ground at No. 1 contacts of relay CX.

Operation of relay RV2B connects relay A inside hybrid coils 44 and 45 for voice transmission to supervise the talking connection, and also disconnects the multiferquency output pulsing conductors 38 and 39. Relay A is connected between the tip and ring conductors over a path which may be traced from the selector tip conductor T, No. 2 contacts of relay RV2B, conductor 42, hybrid coil 44, No. 1 contacts of relay RV, No. 3 contacts of relays RV2B, conductor RA to the lower coil of relay A. Similarly, the path of the upper operating coil may be traced from negative battery through the upper winding of relay A, conductor TA, No. 6 contacts of relay RV2B, No. 4 contacts of relay RV, hybrid coil 45, conductor 43, No. 8 contacts of relay RV2B to the selector ring conductor.

Relay RV is now adapted to repeat receiver off-hook signals from relay CX over a circuit including conductor 52, No. 2 contacts of relay RV2A, conductor 24, No. 2 contacts of relay OPP, conductor 23, conductor 22, No. 8 contacts of relay B, conductor 21 and No. 1 contacts of relay CX.

When the subscribers have concluded their conversation and replaced their receivers on the respective switchhooks, relay SV releases (through means not shown) and relay TKT releases as a result of release of relay CXT when the battery potential is removed from the ring conductor at the local office. Relay TKT released, at its No. 1 contacts, causes release of relay H which in turn releases relay CO at the No. 2 contacts of relay H. The release of relay CO restores the ground condition to the outgoing end of the trunk circuit and releases the associated crossbar switches in the incoming link and connector circuit thereby restoring the circuit to normal.

*Release of trunk circuit at local office*

In the originating local office (Fig. 1), relay A releases when the calling party disconnects, releasing relay B which in turn permits relays RV2A and SL1, TK and TDD to release through the opening of the No. 4 and No. 6 contacts, respectively of relay B. Relay RV2B releases through the opening of the No. 8 contacts of relay B. Release of relay B also energizes release magnets signals for transmitting over said trunk to a distant office said reconstructed code signals and said digit stored in said trunk digit registration means, direct-current signaling means connected to said trunk and responsive to additional direct-current signals dialed over said calling line into said trunk for directly repeating said additional dialed signals over said trunk to a distant office, means connected to said trunk in said distant office for receiving said multifrequency signals and said direct-current signals, means in said trunk circuit for inhibiting said multifrequency signaling means prior to the energization of said multifrequency receiving means in said distant office, and means in said trunk circuit for inhibiting said direct-current signaling means prior to the storage of a digit in said trunk digit storage means, said direct-current signaling means and multifrequency signaling means including means for simultaneously transmitting both types of signals over said trunk to said distant office.

8. In an automatic telephone system, a calling line, outgoing trunks extending to a distant telephone office, selector means under the control of said calling line for establishing a connection from said line to an idle one of said trunks, said selector means being responsive to decimal direct-current code signals dialed into said line by a calling subscriber, means connected to said trunk for reconstructing said decimal direct-current code signals, digit registration means in said trunk for storing a digit dialed over said subscriber's calling line after the connection of said line to said trunk, multifrequency signaling means connected to said digit registration means and to said means for reconstructing said code signals for transmitting over said trunk said reconstructed code signals and said digit stored in said digit registration means; direct-current signaling means connected to said trunk for repeating directly over said trunk the signals dialed subsequent to the digit stored in said digit registration means; said multifrequency signaling means and said direct-current signaling means operating simultaneously to transmit both types of signaling over said trunk, multifrequency receiving means and direct-current receiving means connected to said trunk at the distant office end thereof, means in said trunk circuit for inhibiting the operation of said multifrequency signaling means prior to the energization of said multifrequency receiving means at the distant office, means in said trunk current for inhibiting said direct-current signaling means prior to the registration of a digit in said digit registration means, means for disconnecting said multifrequency signaling means after the termination of signaling, means for connecting said calling line to said trunk circuit for voice communication, and means for releasing said digit registration means.

9. In an automatic telephone system, a calling line, a plurality of trunks over any one of which connections may be extended to a distant office, selector switches responsive to the dialing of code digits over said calling line by a subscriber for extending a connection from said calling line to one of said trunks, trunk digit storage means connected to said trunk for registering an additional digit dialed over said calling line after said line is connected to said trunk, relay indicating means connected to said trunk digit storage means for indicating the storage of a digit therein, means under control of said trunk for reconstructing said code digits, multifrequency signaling means connected to said last-mentioned means and to said trunk digit storage means for transmitting over said trunk to a distant office said reconstructed code signals and said digit stored in said trunk digit storage means, pulse generating means for controlling said multifrequency signaling means, direct-current signaling means responsive to said relay indicating means for directly transmitting additional digits dialed over said trunk, means connected to said trunk at the distant office end thereof for receiving and registering said multifrequency and direct current signals, means connected to said trunk for inhibiting said multifrequency signaling means prior to the energization of said multifrequency receiving means at the distant office end of said trunk, means connected to said trunk for inhibiting said direct-current signaling means prior to the operation of said relay indicating means, means for connecting said calling line to said trunk circuit for voice transmission subsequent to the termination of signaling, means for releasing said trunk digit storage means subsequent to the termination of signaling, and means responsive to said multifrequency signaling means and said direct-current signaling means for enabling the simultaneous transmission of both types of signals.

References Cited in the file of this patent

UNITED STATES PATENTS

| | | |
|---|---|---|
| 2,272,464 | Hensler | Feb. 10, 1942 |
| 2,678,968 | Gooderham | May 18, 1954 |
| 2,739,184 | Baird | Mar. 20, 1956 |
| 2,834,835 | Shepherd | May 13, 1958 |